United States Patent [19]

Iwakiri et al.

[11] Patent Number: 5,733,659
[45] Date of Patent: Mar. 31, 1998

[54] TRANSPARENT RIGID RESIN MOLDED PRODUCT AND PROCESS FOR PRODUCING THE SAME

[75] Inventors: Tsuneaki Iwakiri; Hiroyuki Imaizumi, both of Hiratsuka, Japan

[73] Assignee: Mitsubishi Engineering-Plastics Corporation, Japan

[21] Appl. No.: 605,433

[22] Filed: Feb. 22, 1996

[30] Foreign Application Priority Data

Feb. 27, 1995 [JP] Japan .................... 7-061547
Dec. 15, 1995 [JP] Japan .................... 7-327069

[51] Int. Cl.$^6$ .................................... B32B 27/36
[52] U.S. Cl. ........................... 428/412; 428/215
[58] Field of Search ...................... 428/412, 215

[56] References Cited

FOREIGN PATENT DOCUMENTS 0 228 041   7/1987   European Pat. Off. .

OTHER PUBLICATIONS

Database WP1, Section Ch, Week 9351, Derwent Publications Ltd., London; GB; Class A23, AN 93–410952; XP002002220 & JP–A–05 310 956, 22 Nov. 1993, abstract.
Database WP1, Section Ch, Week 9350, Derwent Publications Ltd., London, GB; Class A32, AN 95–228834, XP002002221 & JP–A–07 138 465, May 1995, abstract.

*Primary Examiner*—Christopher Raimund
*Attorney, Agent, or Firm*—Nixon & Vanderhye

[57] ABSTRACT

A transparent rigid resin molded product comprises a pair of therapeutic films or sheets, and a reinforcing resin composition layer interposed between the pair of thermoplastic films or sheets, and composed of a transparent thermoplastic resin and a glass filler dispersed in the transparent thermoplastic resin, the difference in refractive index between the transparent thermoplastic resin and the glass filler being not more than 0.015, and the content of the glass filler being 1 to 60% by weight based on a total weight of the molded product.

14 Claims, 1 Drawing Sheet

TRANSPARENT RIGID RESIN MOLDED PRODUCT AND PROCESS FOR PRODUCING THE SAME

BACKGROUND OF THE INVENTION

This invention relates to a transparent rigid resin molded product and a process for producing the transparent rigid resin molded product, and more particularly to a transparent rigid resin molded product suitable as an alternate material of a transparent window glass or a function- or design-imparted glass structural product and a process for producing the transparent rigid resin molded product. Specifically, the transparent rigid resin molded product of the present invention not only exhibits a high rigidity but also is superior in transparency, light-weight, safety, durability and profitability, whereby the transparent rigid resin molded product of the present invention is suitably applied to automobile parts, medical supplies, safety members, building materials, house-hold products or the like.

It is known in the art that a glazing material such as a windshield glass as an automobile part or a window glass as a building material is composed of a glass portion and a surrounding frame portion made of metal, resin or wood. Such a glazing material, however, shows various defects such as heavy weight, crack formation, large number of parts, large number of assembling steps, low productivity, requirement of separate designing steps, insufficient durability or the like. In order to achieve the light-weight of the glazing material, a plastic molded product has been used as an alternate material for the glass portion. Such a plastic molded product is prepared by subjecting an extruded plate or a cast plate made of a synthetic resin to thermal bending process or subjecting the synthetic resin to injection-molding process. An adequate filler such as glass or the like is added to the molded product in order to improve a rigidity thereof in the event that the molded product is required to have a high rigidity.

However, if such a glass filler is added to the molded product made of a synthetic resin, a transparency of the synthetic resin is deteriorated due to a large difference in a refractive index between the glass filler (commercially available glass filler has generally a refractive index of 1.555) and a polycarbonate resin (commercially available polycarbonate has generally a refractive index of 1.585).

Moreover, even though the refractive indices of the glass filler and the polycarbonate resin are completely identical to each other, deterioration in transparency of the molded product still occurs due to boundary conditions between the glass filler and the polycarbonate resin, and surface conditions and thickness of the molded product, so that it is extremely difficult to ensure a stable transparency of the molded product. In addition, when the glass portion is replaced with a plastic member, separate steps such as a hard coating step, a printing step or the like are required to improve a surface hardness thereof or impart a design thereto. That is, in conventional techniques, if it is contemplated to substitute the plastic member for the rigid glass potion, there still occurs problems such as deterioration in transparency, large number of parts or large number of assembling steps together with requirement of separate steps such as hard coating step, printing step or the like.

As a result of the present inventors' intense studies and investigations to overcome the afore-mentioned problems, it has been found that by placing (fitting) a pair of thermoplastic films or sheets on an inner surface of an injection mold so as to contact with the inner surface of the injection mold; and melt-injecting a reinforcing resin composition composed of a thermoplastic resin and a glass filler in which the difference in refractive index between the thermoplastic resin and the glass filler is not more than 0.015 and the content of the glass filler is 1 to 60% by weight based a total weight of the molded product, into the injection mold to form an integrated product having a laminate structure, the obtained rigid resin molded product shows a high rigidity and is superior in transparency, light-weight, safety, durability and profitability and is suitably applicable to automobile parts, medical supplies, safety members, building materials, house-hold products or the like. The present invention is accomplished based on the above findings.

SUMMARY OF THE INVENTION

It is an object of the present invention to provide a rigid molded product composed of a resin material, which shows a high rigidity, is superior in transparency, and has a functionality and a design-endowing ability.

It is another object of the present invention to provide a process for producing a rigid molded product composed of a resin material, in which production of the rigid molded product can be achieved in relatively small number of manufacturing steps and in less expense.

To accomplish the aims, in a first aspect of the present invention, there is provided a transparent rigid resin molded product comprising:

a pair of thermoplastic films or sheets; and a reinforcing resin composition layer composed of a transparent thermoplastic resin and a glass filler dispersed in said transparent thermoplastic resin, interposed between said pair of thermoplastic films or sheets, the difference in refractive index between said transparent thermoplastic resin and said glass filler being not more than 0.015, and the content of said glass filler being in the range of 1 to 60% by weight based on a total weight of said molded product.

In a second aspect of the present invention, there is provided a transparent rigid resin molded product comprising:

a pair of thermoplastic films or sheets; and a reinforcing resin composition layer composed of a transparent thermoplastic resin and a glass filler dispersed in said transparent thermoplastic resin, interposed between said pair of thermoplastic films or sheets, the difference in refractive index between said transparent thermoplastic resin and said glass filler being not more than 0.015, and the content of said glass filler being in the range of 1 to 60% by weight based on a total weight of said molded product, the transparent rigid resin molded product being obtained by fitting said pair of thermoplastic films or sheets on an inner surface of an injection mold such that the thermoplastic films or sheets are contacted with the inner surface of said injection mold; and melt-injecting said reinforcing resin composition composed of the transparent thermoplastic resin and the glass filler into said injection mold, the difference in refractive index between said transparent thermoplastic resin and said glass filler being not more than 0.015, and the content of said glass filler being in the range of 1 to 60% by weight based on a total weight of said molded product, so that said reinforcing resin composition is integrated with said pair of thermoplastic films or sheets.

In a third aspect of the present invention, there is provided a transparent rigid resin molded product comprising:

a pair of thermoplastic films or sheets; and a reinforcing resin composition layer composed an aromatic polycarbonate resin, a glass filler and polycaprolactone, interposed between said pair of thermoplastic films or sheets, the difference in refractive index between said aromatic polycarbonate resin and said glass filler being not more than 0.015, the content of said glass filler being in the range of 1 to 60% by weight based on a total weight of said molded product and the content of said polycaprolactone being in the range of 1 to 60% by weight based on a total weight of said molded product.

In a fourth aspect of the present invention, there is provided a transparent rigid resin molded product comprising:

a pair of thermoplastic films or sheets; and a reinforcing resin composition layer composed an aromatic polycarbonate resin, a glass filler and polycaprolactone, interposed between said pair of thermoplastic films or sheets, the difference in refractive index between said aromatic polycarbonate resin and said glass filler being not more than 0.015, the content of said glass filler being in the range of 1 to 60% by weight based on a total weight of said molded product and the content of said polycaprolactone being in the range of 1 to 60% by weight based on a total weight of said molded product, the transparent rigid resin molded product being obtained by fitting said pair of thermoplastic films or sheets on an inner surface of an injection mold such that the thermoplastic films or sheets are contacted with the inner surface of said injection mold; and melt-injecting said reinforcing resin composition composed an aromatic polycarbonate resin, a glass filler and polycaprolactone into said injection mold, the difference in refractive index between said aromatic polycarbonate resin and said glass filler being not more than 0.015, the content of said glass filler being in the range of 1 to 60% by weight based on a total weight of said molded product and the content of said polycaprolactone being in the range of 1 to 60% by weight based on a total weight of said molded product, so that said reinforcing resin composition is integrated with said pair of thermoplastic films or sheets.

In a fifth aspect of the present invention, there is provided a process for producing a transparent rigid resin molded product, comprising the steps of:

stamping a thermoplastic film or sheet provided, on one side thereof, with at least one functional layer selected from the group consisting of a hard coat layer, an anti-fogging layer, an anti-static layer, an anti-reflective layer and a heat radiation-shielding layer, to form two sheet segments each having the same shape as that of a surface of the molded product;

fitting said two sheet segments on an inner surface of an injection mold such that said at least one functional layer on each of said two sheet segments is contacted with the inner surface of said injection mold;

after closing said injection mold, melt-injecting a reinforcing resin composition composed of a transparent thermoplastic resin and a glass filler so as to form an integrated product having a laminate structure composed of said two sheet segments and the reinforcing resin composition, wherein the difference in refractive index between said transparent thermoplastic resin component and said glass filler component is not more than 0.015 and the content of said glass filler component is in the range of 1 to 60% by weight based on a total weight of said molded product; and opening said injection mold to remove said integrated product.

In a sixth aspect of the present invention, there is provided a process for producing a transparent rigid resin molded product, comprising the steps of:

stamping a thermoplastic film or sheet provided, on one side thereof, with at least one functional layer selected from the group consisting of a hard coat layer, an anti-fogging layer, an anti-static layer, an anti-reflective layer and a heat radiation-shielding layer, to form two sheet segments each having the same shape as that of a surface of the molded product;

fitting said two sheet segments on an inner surface of an injection mold such that said at least one functional layer on each of said two sheet segments is contacted with the inner surface of said injection mold;

after closing said injection mold, melt-injecting a reinforcing resin composition composed of an aromatic polycarbonate resin, a glass filler and polycaprolactone, so as to form an integrated product having a laminate structure composed of said two sheet segments and the reinforcing resin composition, wherein the difference in refractive index between said aromatic polycarbonate resin and said glass filler is not more than 0.015, the content of said glass filler is in the range of 1 to 60% by weight based on a total weight of said molded product and the content of said polycaprolactone is in the range of 1 to 60% by weight based on a total weight of said molded product; and opening said injection mold to remove said integrated product.

DETAILED DESCRIPTION OF THE INVENTION

Figure 1:
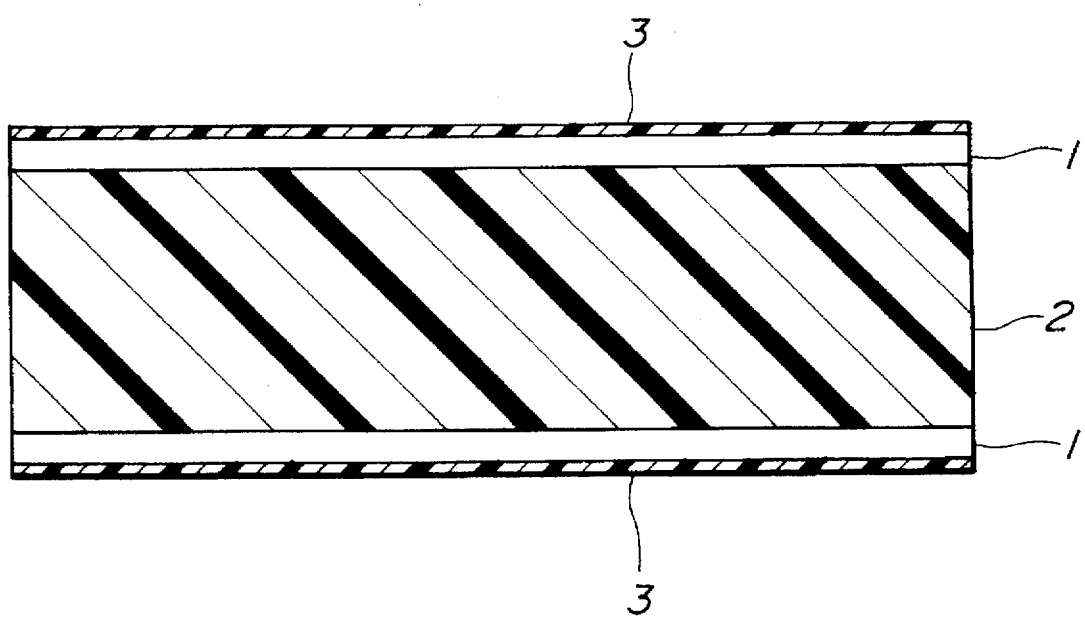
FIG. 1 is a cross-sectional view schematically showing a transparent rigid resin molded product according to the present invention.

The reinforcing resin composition used in the present invention is composed of the transparent thermoplastic resin and a glass filler dispersed therein. Examples of the suitable thermoplastic resin component are not particularly restricted, but transparent resins or a composition thereof such as a polycarbonate resin, a composition of a polycarbonate resin and a polybutylene-terephthalate resin, a polymethylmethacrylate resin, a copolymer of acrylonitrile and styrene, a polystyrene resin, a copolymer of methylmethacrylate and styrene, or the like may be exemplified. Among them, polycarbonate resin is preferred.

As the polycarbonate resin, an aromatic polycarbonate resin may be exemplified. Specific example of the aromatic polycarbonate resin may be polymers prepared by a known method from at least one divalent phenol-based compound such as 2,2-bis-(4-hydroxyphenyl)-propane and 2,2-bis-(3,5-dibromo-4-hydroxyphenyl)-propane, and a precursor of carbonate such as phosgene. Especially, in the present invention, from a standpoint of a high rigidity, a transparency, a heat resistance and a wear resistance required for the molded product, an aromatic polycarbonate resin having a viscosity-average molecular weight of 15,000 to 35,000 calculated as a viscosity of its methylene chloride solution at 25° C., is preferable.

The glass filler component of the reinforcing resin composition may be those having such a refractive index that a difference in refractive index between the transparent thermoplastic resin and the glass filler is not more than 0.015, preferably not more than 0.010. When the difference exceeds 0.015, a transparency of the rigid resin molded product is unsuitably deteriorated.

The glass filler is not particularly restricted, but may be of any suitable shape as far as they can be well blended with the thermoplastic resin. Examples of the suitable glass filler may include glass fibers, glass flakes, glass beads, glass power or glass balloon. Preferably, the glass filler is surface-treated with a silane coupling agent so as to be uniformly dispersed in the thermoplastic resin upon blending and melt-injection molding. The glass fibers may be in the form of short fibers (namely so-called chopped strands) having generally a length of 0.005 mm to 30 mm and a diameter of 5 to 50 μm. A materiel of the glass filler component is preferably a non-alkali glass or similar glass materials so as not to promote decomposition of the transparent thermoplastic resin.

An amount of the glass filler component blended is in the range of 1 to 60% by weight, preferably 5 to 30% by weight based on a total weight of the molded product comprising the reinforcing resin composition composed of the transparent thermoplastic resin component, the glass filler component and other optional components such as polycaprolactone, etc., and the transparent thermoplastic films or sheets integrated with the reinforcing resin composition. When the amount of the glass filler is too low, the obtained molded product cannot have a sufficient rigidity. On the other hand, when the amount thereof is too large, not only optical properties of the obtained molded product is considerably deteriorated but also characteristics of the molded product are poor because of using a transparent thermoplastic resin having a low molecular weight.

The polycaprolactone, which can be optionally blended with the reinforcing resin composition, may be a polymer of caprolactone, especially ε-caprolactone having a repeating unit represented by (—$CH_2$—$CH_2$—$CH_2$—$CH_2$—$CH_2$—CO—O—). The polycaprolactone may be ones having methylene chains whose hydrogen atoms are partially substituted with a halogen atom or a hydrocarbon group. Further, the polycaprolactone may be ones esterified or etherified to introduce ester- or ether-terminal group thereinto. The polycaprolactone preferably has a number-average molecular weight of 5,000 to 40,000. Such a polycaprolactone can be produced by subjecting caprolactone to a ring-opening polymerization in the presence of a catalyst such as an acid, a base or an organic metal compound.

An amount of the polycaprolactone blended is in the range of 1 to 60% by weight, preferably 5 to 50% by weight based on a total weight of the molded product. When the amount of the polycaprolactone blended is too low, the obtained molded product has an insufficient transparency. On the other hand, when the amount is too large, a mechanical strength and thermal properties of the obtained molded product is deteriorated.

According to the present invention, in order to give any optional color tone to the resultant molded product, a dye or pigment may be added to the reinforcing resin composition. Examples of the suitable dye or pigment may include azo-based dyes, cyanine-based dyes, quinoline-based dyes, perylene-based dyes or any other dyes normally used for coloring a thermoplastic resin. The dye or pigment can be blended in such an adequate amount as not to deteriorate the transparency. Moreover, other additives such as a stabilizing agent, a releasing agent or an ultra-violet absorbing agent may be added in an effective amount to the reinforcing resin composition as far as the addition of the additive adversely affects characteristics and properties of the molded product of the present invention.

A thickness of the reinforcing resin composition layer may be appropriately determined depending upon intended use of the rigid resin molded product. Preferably, the thickness of the reinforcing resin composition layer is in the range of 1 mm to 10 mm.

The thermoplastic resin films or sheets used in the molded product of the present invention is not restricted to particular ones and may be therefore composed of any thermoplastic resin material. Examples of the suitable thermoplastic resin materials for the films or sheets may include a transparent resin and a composition thereof such as a polycarbonate resin, a composition of a polycarbonate resin and a polybutylene-terephthalate resin, a polymethylmethacrylate resin, a copolymer of acrylonitrile and styrene, a polystyrene resin, a copolymer of methylmethacrylate and styrene, or the like. Preferred resin material for the thermoplastic resin films or sheets is a polycarbonate resin or a composition thereof because these resins can exhibit a suitable transparency and an excellent wear resistance. When such thermoplastic resin films or sheets composed of the polycarbonate resin or the composition thereof, preferably aromatic polycarbonate resin are used, the obtained molded product is suitably applied to a high-rigidity resin plate such as a window glass, etc., which is required to have a wear resistance.

It is preferred that a molecular weight of the polycarbonate resin be larger than that of the thermoplastic resin component contained in the reinforcing resin composition to be injection-molded, whereby an overcoat layer such as a functional layer or a design-imparting layer formed thereon can be retained without deformation thereof. Specifically, the aromatic polycarbonate resin having a viscosity-average molecular weight of 20,000 to 35,000 calculated as a viscosity of methylene chloride solution thereof at 25° C. Due to the fact that the thermoplastic resin films or sheets and the reinforcing resin composition are integrated together to form a laminate article by using a melt-injection molding method, the thermoplastic resin films or sheets are preferably composed of the same kind of aromatic polycarbonate as those used as a component of the reinforcing resin composition in view of a thermal fusion and an optical uniformity.

A thickness of each of the thermoplastic resin films or sheets may be generally 100 to 1,000 μm, preferably 200 to 700 μm. Each of the thermoplastic resin films or sheets is provided, on one side thereof, with at least one functional layer selected from the group consisting of a hard coat layer, an anti-fogging layer, an anti-static layer, an anti-reflective layer and a heat radiation-shielding layer, if required.

The functional layer can be formed on the thermoplastic resin films or sheets by using various known methods. For example, in case the hard coat layer is to be formed on the thermoplastic film or sheet, a primer coating layer may be first formed on a surface thereof, if necessary, before formation of the hard coat layer. Next, an epoxy-based, acryl-based, amino-based, polysiloxane-based or colloidal silica-based hard coat agent is applied on the primer coating layer and then cured by radiation of heat or ultra-violet light. In case the anti-fogging layer is to be formed, an anti-fogging coating composition composed generally of a water-soluble or hydrophilic resin and a surface active agent as essential constituents is applied thereon and then cured. Similarly, other functional layer such as an anti-static layer, an anti-reflective layer or a heat radiation-shielding layer may be formed by applying a coating composition having the functionality on the surface of the thermoplastic film or sheet. Alternatively, a thin layer having such a functionality may be formed on the surface of the thermoplastic film or sheet by using a vacuum deposition method. Moreover, layers having two or more different functionalities may be formed on the surface of the thermoplastic resin film or sheet. In addition to these functional layers, a design-imparting layer may be formed on the thermoplastic resin film or sheet. Alternatively, the afore-mentioned functional layer can serve as the design-imparting layer. The design to be imparted on the layer can be produced by preliminarily subjecting the layer to a decorative coating treatment.

In accordance with the present invention, the transparent rigid resin molded product can be produced in the following manner. That is, a pair of the transparent thermoplastic films or sheets are first placed (fitted) on an inner surface of an injection mold. Successively, the aforementioned reinforcing resin composition is melt-injected in a space between the two thermoplastic resin films or sheets in the injection mold, so that the thermoplastic resin films or sheets and the reinforcing resin composition are combined together to form an integrated product having a laminate structure. Thus, the transparent high-rigidity resin molded product can be obtained in an industrially advantageous manner.

In addition, in order to promote a thermal fusion between the thermoplastic resin films or sheets and the reinforcing resin composition and to ensure the formation of an integrated, molded product having a laminate structure, the thermoplastic resin films or sheets may each be subjected to primer coating treatment. A resin material used for the primer coating treatment may be those having a higher melt viscosity than that of the resin to be injection-molded and exhibiting a good adherence to the thermoplastic resin films or sheets. For example, the primer coating layer may be composed primarily of the same kind of a resin material as the resin to be injection-molded, but have a higher molecular weight than that of the resin to be injection molded or resins curable upon radiation of heat or an ultra-violet light.

Specifically, in case a polymethylmethacrylate resin or a copolymer of acrylonitrile and styrene is used in the reinforcing resin composition to be injection-molded, the primer coating layer may be preferably composed of a solution of acrylate-based homopolymer or copolymer, methacrylate-based homopolymer or copolymer, or an acrylate-based or methacrylate-based coating composition which is curable upon radiation of heat or ultra-violet light. In case a polystyrene resin is used in the reinforcing resin composition to be injection-molded, the primer coating layer may be composed of an acrylate-based copolymer, methacrylate-based copolymer or a composition containing the copolymer. Specifically, as the composition containing the copolymer, a composition containing an acrylate-based or methacrylate-based copolymer and an acrylate-based or methacrylate-based homopolymer, is preferable. Particularly preferred is the copolymer resin containing a flexibility-imparting co-monomer such as butylacrylate, for example, a high-molecular weight copolymer of methylmethacrylate and butylacrylate or a composition containing the copolymer. The primer coating layer can be formed on the surface of each of the thermoplastic resin films or sheets by a laminating method. For instance, the polycarbonate film or sheet wherein a resin film composed of an acrylate-based or methacrylate-based copolymer, a copolymer of ethylene and vinyl acetate, or a copolymer of acrylonitrile and styrene is laminated over the said film or sheet, is suitably used as the thermoplastic resin films or sheets in case where polymethylmethacrylate, polystyrene or a copolymer of acrylonitrile and styrene is used as a thermoplastic resin component of the reinforcing resin composition to be injection-molded. This primer coating layer exhibits an excellent adherence to these resin materials.

The high-rigid resin molded product according to the present invention can be produced by a method typically including the following steps:

(1) stamping a thermoplastic film or sheet provided, if necessary on one side thereof, with at least one functional layer selected from the group consisting of a hard coat layer, an anti-fogging layer, an anti-static layer, an anti-reflective layer and a heat radiation-shielding layer, to form two sheet segments each having the same shape as that of a surface of the molded product;

(2) fitting the two sheet segments on an inner surface of an injection mold such that the two sheet segments or the functional layers provided thereon are contacted with the inner surface of the injection mold;

(3) after closing the injection mold, melt-injecting into the injection mold a reinforcing resin composition composed of a transparent thermoplastic resin and a glass filler, and if necessary, polycaprolactone so as to form an integrated product composed of the two sheet segment and the said reinforcing resin composition, wherein the difference in reflective index between the transparent thermoplastic resin and the glass filler is not more than 0.015, the content of the glass filler is in the range of 1 to 60% by weight based on a total weight of the molded product and the content of polycaprolactone is in the range of 1 to 60% by weight based on a total weight of the molded product; and (4) opening said injection mold to remove the integrated molded product.

Next, a transparent rigid resin molded product according to the present invention is described by referring to the accompanying drawing. FIG. 1 schematically illustrates in cross-section a transparent rigid resin molded product of the present invention.

The rigid resin molded product according to the present invention includes a pair of transparent films or sheets 1 composed of a thermoplastic resin, and a reinforcing resin composition layer 2 which is interposed between the two transparent films or sheets 1, and if required, functional layers 3 which are formed on an outer surface of each of the transparent films or sheets 1.

The rigid resin molded product according to the present invention has a flexural modulus not less than 30,000 kgf/cm$^2$ an Izod impact strength not less than 5 kg·cm/cm, a haze not more than 40%.

In accordance with the present invention, the transparent high-rigidity resin molded product can be produced with a stable quality and in an effective and economic manner. Such a rigid resin molded product is provided on a surface thereof with a functional layer such as a hard coat layer, an anti-fogging layer, an anti-static layer, an anti-reflective layer and a heat radiation-shielding layer, or various design-imparting layers. These functional and design-imparting layers can be easily produced without increase in manufacturing steps. The thus-obtained rigid resin molded product not only exhibits a high rigidity but also is superior in transparency, light-weight, safety, durability or profitability, whereby the molded product is useful in various applications such as automobile parts such as a windshield glass, medical supplies, safety members, building materials, house-hold products or the like.

EXAMPLES

The present invention is described in more detail below by way of examples. However, these examples are only illustrative and not intended to limit a scope of the present invention.

First, measuring methods for determining properties of the rigid resin shaped material, which were used through the examples and the comparative examples, are described below.

Flexural Modulus:

Specimens which were cut from a disc-like molded products as produced in later-mentioned examples and comparative examples, were subjected to a measurement test according to JIS K7203, in which a flexural modulus thereof was measured in the direction of thickness of each disc-like molded product.

Haze:

The disc-like molded products which were produced in later-mentioned examples and comparative examples, were measured with respect to the haze by using a haze meter (HGM-2DP, manufactured by Suga Tester Co., Ltd.).

Total Light Transmittance:

The disc-like molded products which were produced in later-mentioned examples and comparative examples, were subjected to a measurement test according to JIS K7105 in which the total light transmittance thereof was measured in its thickness direction.

Izod Impact Strength:

Specimens notched which were cut from disc-like molded products as produced in later-mentioned examples and comparative examples, were subjected to a measurement test according to JIS K7110, in which an Izod impact strength of each specimen was measured in the direction perpendicular to the thickness direction of the disc-like molded product.

Example 1

Two polycarbonate resin sheets (Iupilon-Sheet CFI-1, manufactured by Mitsubishi Engineering Plastics Corporation) each having a thickness of 0.5 mm and a viscosity-average molecular weight of 28,000, and each provided on one side surface thereof with a silicone-based thermosetting hard coat layer were fitted on an inner surface of an injection mold with a cavity having a diameter of 100 mm and a thickness of 4 mm such that the hard coat layer provided on each polycarbonate resin sheet was contacted with an inner surface of the injection mold. A reinforcing resin composition described below was melt-injected through a side gate into the injection mold, so that a space between the two polycarbonate sheets was filled with the reinforcing resin composition, thereby obtaining an integrated molded product having a laminate structure composed of the two polycarbonate resin sheets and the reinforcing resin composition layer.

The reinforcing resin composition used above was composed of a polycarbonate resin (Iupilon S-3000, manufactured by Mitsubishi Engineering Plastics Corporation) having a viscosity-average molecular weight of 21,000 and a refractive index of 1.585, and glass fibers having an average length of 6 mm, an average diameter of 16 µm and a refractive index of 1.579. In the injection molding process, the reinforcing resin composition was used in the form of pellets which were prepared by using an extruder (VS-40, manufactured by Tanabe Plastic Co., Ltd.). A glass content of the composition was adjusted to 10% by weight based on a total weight of the integrated molded product.

The measurements of the properties of the thus-obtained molded product were conducted. The results are shown in Table 1.

Example 2

The same procedure as in Example 1 was carried out except that the glass content was 20% by weight, thereby obtaining an integrated molded product with a laminate structure.

The measurements of the properties of the thus-obtained molded product were conducted. The results are shown in Table 1.

Example 3

The same procedure as in Example 1 was carried out except that the reinforcing resin composition was composed of a copolymer of methylmethacrylate and styrene (F-71902, manufactured by Nippon Steel Chemical Co., Ltd.) having a reflective index of 1.555, and glass fibers having an average length of 3 mm, an average diameter of 13 µm and a reflective index of 1.555, thereby obtaining an integrated molded product with a laminate structure.

The measurements of the properties of the thus-obtained molded product were conducted. The results are shown in Table 1.

Example 4

The same procedure as in Example 3 was carried out except that the glass content was 20% by weight, thereby obtaining an integrated molded product with a laminate structure.

The measurements of the properties of the thus-obtained molded product were conducted. The results are shown in Table 1.

Comparative Examples 1 to 4

The same procedure as in Examples 1 to 4 was carried out except that the polycarbonate resin sheets were not used and therefore only the reinforcing resin composition was injection-molded without fitting the polycarbonate resin sheets on the inner surface of the injection mold.

The measurements of the properties of the thus-obtained molded product were conducted. The results are shown in Table 1.

Comparative Example 5

The same procedure as in Example 1 was carried out except that the polycarbonate sheets were not used and the reinforcing resin composition containing no glass fibers was injection-molded without fitting the polycarbonate resin sheets on the inner surface of the injection mold.

The measurements of the properties of the thus-obtained molded product were conducted. The results are shown in Table 1.

Comparative Example 6

The same procedure as in Example 3 was carried out except that the polycarbonate sheets were not used and only the reinforcing resin composition containing no glass fibers was injection-molded without fitting the polycarbonate resin sheets on the inner surface of the injection mold.

The measurements of the properties of the thus-obtained molded product were conducted. The results are shown in Table 1.

Comparative Example 7

The same procedure as in Example 2 was carried out except that the glass fibers were replaced with those having an average length of 3 mm, an average diameter of 13 µm and a reflective index of 1.555, thereby obtaining an integrated molded product with a laminate structure.

The measurements of the properties of the thus-obtained molded product were conducted. The results are shown in Table 1.

TABLE 1

| Example No. | Placement of PC Sheet in Mold | Molding Resin | Difference of Refractive Index | Glass Content (wt. %) |
|---|---|---|---|---|
| Example 1 | Yes | PC[(1)] | 0.006 | 10 |
| Comparative Example 1 | No | PC | 0.006 | 10 |
| Example 2 | Yes | PC | 0.006 | 20 |
| Comparative Example 2 | No | PC | 0.006 | 20 |
| Example 3 | Yes | MS[(2)] | 0.000 | 10 |
| Comparative Example 3 | No | MS | 0.000 | 10 |
| Example 4 | Yes | MS | 0.000 | 20 |
| Comparative Example 4 | No | MS | 0.000 | 20 |
| Comparative Example 5 | No | PC | No Glass Fiber Added | |
| Comparative Example 6 | No | MS | No Glass Fiber Added | |
| Comparative Example 7 | Yes | PC | 0.030 | 20 |

Note)
(1): The abbreviation "PC" represents a polycarbonate resin (Iupilon S-3000, manufactured by Mitsubishi Engineering Plastics Corporation) having a viscosity-average molecular weight of 21,000 and a reflective index of 1.585.
(2): The abbreviation "MS" represents a copolymer of methylmethacrylate and styrene (F-71902, manufactured by Nippon Steel Chemical Co., Ltd.) having a weight-average molecular weight of 22,900 and a reflective index of 1.555.

| Example No. | Flexural modulus (kgf/cm$^2$) | Haze (%) | Total light transmittance (%) | Izod Impact Strength (kg · cm/cm) |
|---|---|---|---|---|
| Example 1 | 32,000 | 28 | 88 | 12 |
| Comparative Example 1 | 35,100 | 61 | 85 | 4 |
| Example 2 | 38,200 | 40 | 87 | 12 |
| Comparative Example 2 | 43,300 | 77 | 78 | 6 |
| Example 3 | 37,800 | 23 | 83 | 10 |
| Comparative Example 3 | 42,800 | 54 | 81 | 1 |
| Example 4 | 44,800 | 39 | 75 | 13 |
| Comparative Example 4 | 52,100 | 60 | 77 | 2 |
| Comparative Example 5 | 23,000 | 1 | 93 | 90 |
| Comparative Example 6 | 32,000 | 1 | 94 | 5 |
| Comparative Example 7 | 39,000 | 91 | 93 | 12 |

Example 5

Two polycarbonate resin sheets (Iupilon-Sheet CFI-1, manufactured by Mitsubishi Engineering Plastics Corporation) each having a thickness of 0.5 mm and a viscosity-average molecular weight of 28,000 and each provided on one side surface thereof with a silicone-based thermosetting hard coat layer, were fitted on an inner surface of an injection mold with a disc-like cavity having a diameter of 100 mm and a thickness of 4 mm such that the hard coat layer provided on each polycarbonate resin sheet was contacted with the inner surface of the injection mold. A reinforcing resin composition described below was melt-injected through a side gate into the injection mold, so that a space between the two polycarbonate sheets was filled with the reinforcing resin composition, thereby obtaining an integrated molded product having a laminate structure and composed of the two polycarbonate resin sheets and the reinforcing resin composition layer.

The reinforcing resin composition used above was composed of a polycarbonate resin (Iupilon S-3000, manufactured by Mitsubishi Engineering Plastics Corporation) having a viscosity-average molecular weight of 21,000 and a refractive index of 1.585, glass fibers having an average length of 6 mm, an average diameter of 16 µm and a refractive index of 1.579, and polycaprolactone (manufactured by Daicel Chemical Industries, Co., Ltd.) having a number-average molecular weight of 10,000. The respective contents of the glass fibers and polycaprolactone contained in the reinforcing resin composition were 30% by weight and 7% by weight based on a total weight of the integrated molded product. In the injection molding process, the reinforcing resin composition was used in the form of pellets which were prepared by using an extruder (VS-40, manufactured by Tanabe Plastic Company, Ltd.).

The measurements of the properties of the thus-obtained molded product were conducted. The results are shown in Table 2.

Comparative Example 8

The same procedure as in Example 5 was carried out except that a content of the glass fibers was changed to 65% by weight, to pelletize the reinforcing resin composition. But it was confirmed that the pelletization of the reinforcing resin composition was not attained.

Comparative Example 9

The same procedure as in Example 5 was carried out except that the glass fibers in the reinforcing resin composition were replaced with those having an average length of 3 mm, an average diameter of 13 µm and a reflective index of 1.555, thereby obtaining an integrated molded product with a laminate structure.

The measurements of the properties of the thus-obtained molded product were conducted. The results are shown in Table 2. It was evident from Table 2 that the molded product of Comparative Example 9 had a higher haze value and therefore was inferior in transparency as compared with that of Example 5.

Comparative Example 10

The same procedure as in Example 5 was carried out except that the polycarbonate sheets were not used and therefore only the reinforcing resin composition was injection-molded without fitting the polycarbonate resin sheets on the inner surface of the injection mold.

The measurements of the properties of the thus-obtained molded product were conducted. The results are shown in Table 2. It was evident from Table 2 that the molded product of Comparative Example 10 had a higher haze value and therefore was inferior in transparency as compared with that of Example 5.

Comparative Example 11

The same procedure as in Example 5 was carried out except that the polycarbonate sheets were not used and the reinforcing resin composition containing no glass fibers and no polycaprolactone was injection-molded without placing the polycarbonate resin sheets in the injection mold.

The measurements of the properties of the thus-obtained molded product were conducted. The results are shown in Table 2. It was evident from Table 2 that the molded product of Comparative Example 11 had an extremely low flexural modulus as compared with that of Example 5.

TABLE 2

| Example No. | Presence of Polycarbonate Resin Sheet in Mold | Content of Polycapro-lactone (wt. %) | Glass Content (wt %) | Difference of Refractive Index between Aromatic PC and Glass Filler |
|---|---|---|---|---|
| Example 5 | Yes | 7 | 30 | 0.006 |
| Comparative Example 8 | Yes | 7 | 65 | 0.006 |
| Comparative Example 9 | Yes | 7 | 30 | 0.030 |
| Comparative Example 10 | No | 7 | 30 | 0.006 |
| Comparative Example 11 | No | — | — | — |

| Example No. | Flexural modulus (kgf/cm$^2$) | Haze (%) | Total light transmittance (%) | Izod Impact Strength (kg·cm/cm) |
|---|---|---|---|---|
| Example 5 | 56,000 | 23 | 85 | 14 |
| Comparative Example 8 | Extrusion-pelletization impossible | | | |
| Comparative Example 9 | 56,000 | 91 | 65 | 14 |
| Comparative Example 10 | 78,000 | 83 | 83 | 8 |
| Comparative Example 11 | 23,000 | 0.7 | 93 | 90 |

What is claimed is:

1. A transparent rigid resin-molded product comprising:
   a pair of thermoplastic films or sheets comprising a polycarbonate resin or a composition thereof; and
   a reinforcing resin composition layer which is interposed between said pair of thermoplastic films or sheets, and which comprises an aromatic polycarbonate resin, a glass filler and polycaprolactone,
   said aromatic polycarbonate having a viscosity-average molecular weight of 15,000 to 35,000 calculated as a viscosity of a methylene chloride solution thereof at 25° C., and said polycaprolactone having a number-average molecular weight of 5,000 to 40,000,
   said glass filler being selected from the group consisting of glass fibers, glass flakes, glass beads, a glass powder, glass balloon and a mixture thereof,
   the difference in refractive index between said aromatic polycarbonate resin and said glass filler being not more than 0.015,
   the content of said glass filler being in the range of 1 to 60% by weight based on a total weight of said molded prodouct, and
   the content of said polycaprolactone being in the range of 1 to 60% by weight based on a total weight of said molded product,
   said thermoplastic films or sheets each having a thickness of 100 µm, to 1,000 µm, and
   said reinforcing resin composition layer having a thickness of 1 mm to 10 mm.

2. A molded product according to claim 1, wherein said molded product has a flexural modulus not less than 30,000 kgf/cm$^2$, an Izod impact strength not less than 5 kg·cm/cm, and a haze not more than 40%.

3. A molded product according to claim 1, wherein said pair of thermoplastic films or sheets comprises a homopolymer or a copolymer of an aromatic polycarbonate.

4. A molded product according to claim 1, wherein said aromatic polycarbonate has a viscosity-average molecular weight of 20,000 to 35,000 calculated as a viscosity of a methylene chloride solution thereof at 25° C.

5. A transparent rigid resin-molded product comprising:
   a pair of thermoplastic films or sheets; and
   a reinforcing resin composition layer which is interposed between said pair of thermoplastic films or sheets, and comprises an aromatic polycarbonate resin, a glass filler and polycaprolactone,
   the difference in refractive index between said aromatic polycarbonate resin and said glass filler being not more than 0.015,
   the content of said glass filler being in the range of 1 to 60% by weight based on a total weight of said molded product, and
   the content of said polycaprolactone being in the range of 1 to 60% by weight based on a total weight of said molded product.

6. A molded product according to claim 5, wherein said thermoplastic films or sheets comprises a polycarbonate resin or a composition thereof.

7. A molded product according to claim 5, wherein said aromatic polycarbonate has a viscosity-average molecular weight of 15,000 to 35,000 calculated as a viscosity of a methylene chloride solution thereof at 25° C. and said polycaprolactone has a number-average molecular weight of 5,000 to 40,000.

8. A molded product according to claim 5, wherein said glass filler is selected from the group consisting of glass fibers, glass flakes, glass beads, a glass powder, glass balloon and a mixture thereof.

9. A molded product according to claim 5, wherein said molded product has a flexural modulus not less than 30,000 kgf/cm$^2$, an Izod impact strength not less than 5 kg·cm/cm and a haze not more than 40%.

10. A molded product according to claim 5, wherein said pair of thermoplastic films or sheets each have a thickness of 100 µm to 1,000 µm, and said reinforcing resin composition layer has a thickness of 1 mm to 10 mm.

11. A molded product according to claim 5, wherein said pair of thermoplastic films or sheets comprises a homopolymer or a copolymer of an aromatic polycarbonate.

12. A molded product according to claim 5, wherein said aromatic polycarbonate has a viscosity-average molecular weight of 20,000 to 35,000 calculated as a viscosity of a methylene chloride solution thereof at 25° C.

13. A transparent rigid resin-molded product which comprises:
   a pair of thermoplastic films or sheets comprising a polycarbonate resin or a composition thereof,
   a reinforcing resin composition layer which is interposed between said pair of thermoplastic films or sheets, and which comprises an aromatic polycarbonate resin, a glass filler and polycaprolactone, and at least one functional layer selected from the group consisting of a hard coat layer, an anti-fogging layer, an anti-static layer, an anti-reflective layer and a heat radiation-shielding layer, which functional layer is disposed on an outer surface of each of said pair of thermoplastic films or sheets; and which molded product is produced by:
- (a) fitting said pair of thermoplastic films or sheets on an inner surface of an injection mold such that the functional layer of the thermoplastic films or sheets are contacted with the inner surface of said injection mold, and
- (b) melt-injecting said reinforcing resin composition comprising the transparent thermoplastic resin and the glass filler into said injection mold, wherein the difference in refractive index between said transparent thermoplastic resin and said glass filler being not more than 0.015, and the content of said glass filler being in the range of 1 to 60% by weight based on a total weight of said molded product, so that said reinforcing resin composition is integrated with said pair of thermoplastic films or sheets.

14. A molded product according to claim 13, wherein said aromatic polycarbonate has a viscosity-average molecular weight of 15,000 to 35,000 calculated as a viscosity of a methylene chloride solution thereof at 25° C., said polycaprolactone has a number-average molecular weight of 5,000 to 40,000, said glass filler is selected from the group consisting of glass fibers, glass flakes, glass beads, a glass powder, glass balloon and a mixture thereof, the difference in refractive index between said aromatic polycarbonate resin and said glass filler is not more than 0.015, the content of said polycaprolactone is in the range of 1 to 60% by weight based on a total weight of said molded product, each of said thermoplastic films or sheets has a thickness of 100 µm to 1,000 µm, and said reinforcing resin composition layer has a thickness of 1 mm to 10 mm.

* * * * *